Figure 1:
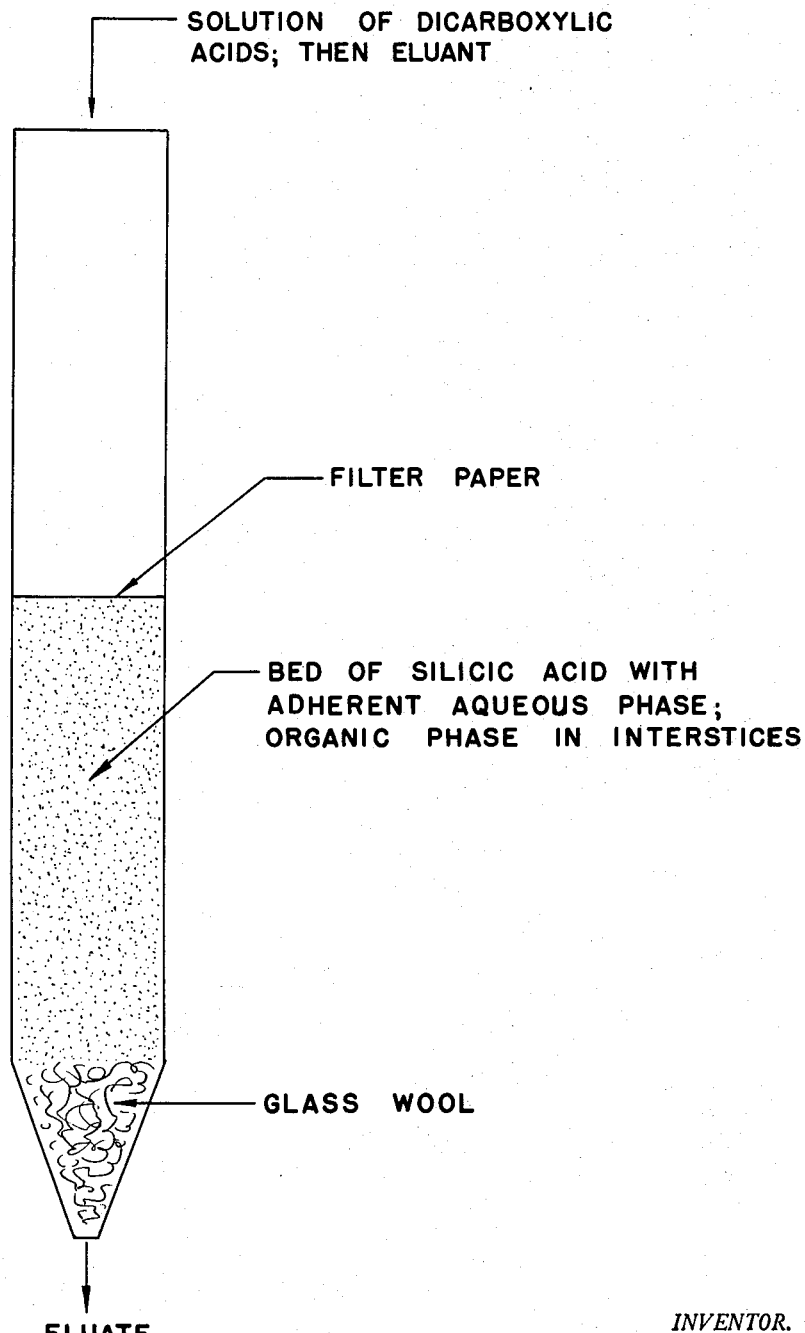

May 1, 1956     TAKERU HIGUCHI     2,744,067
PROCESS OF SEPARATION OF HIGHER MOLECULAR WEIGHT DICARBOXYLIC ACIDS
Filed Sept. 6, 1951     4 Sheets-Sheet 1

FIG. I

May 1, 1956     TAKERU HIGUCHI     2,744,067
PROCESS OF SEPARATION OF HIGHER MOLECULAR WEIGHT
DICARBOXYLIC ACIDS

Filed Sept. 6, 1951

INVENTOR.
TAKERU HIGUCHI
BY
*Jordan C Clark*
ATTORNEY

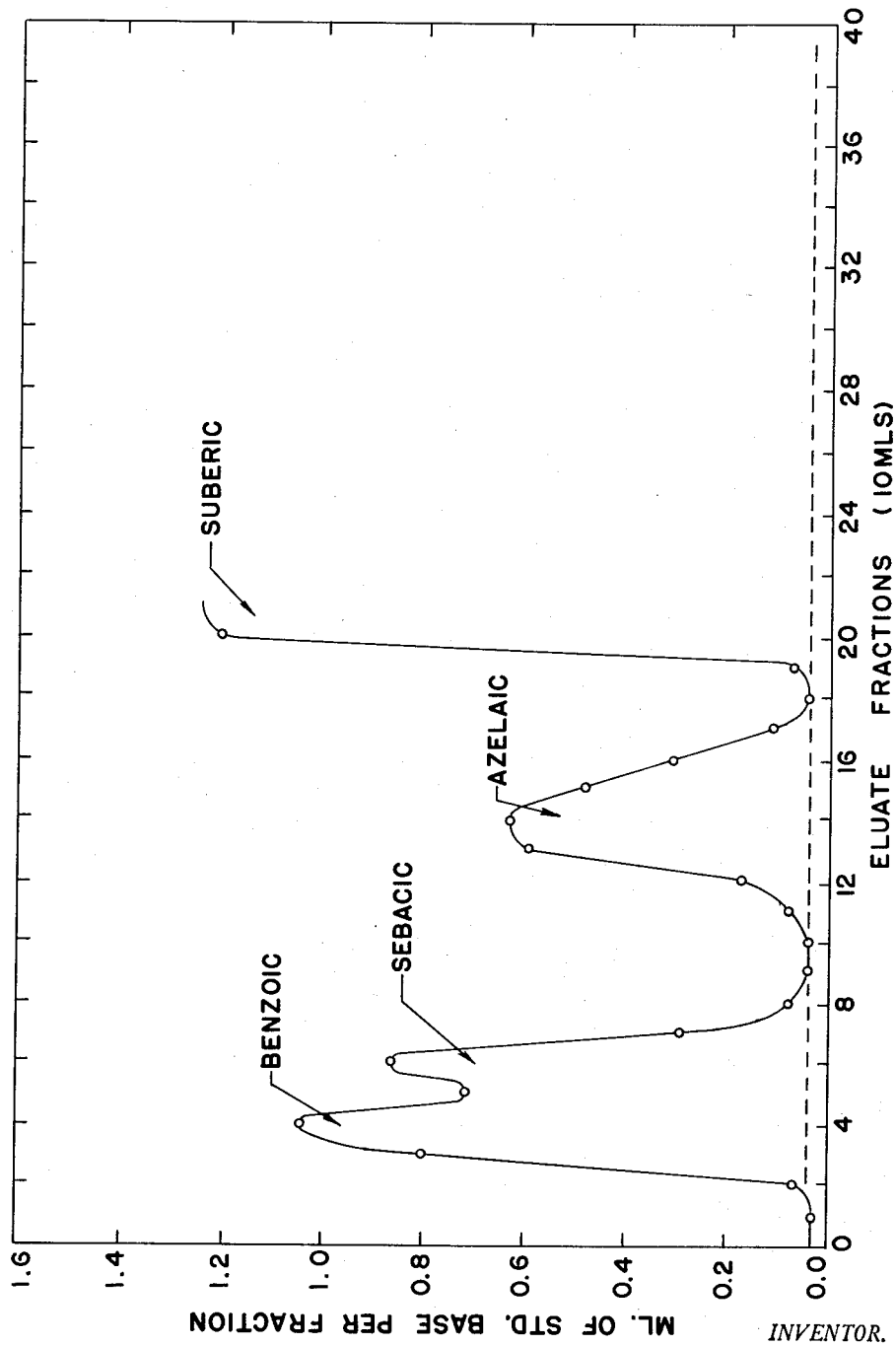

United States Patent Office 2,744,067
Patented May 1, 1956

2,744,067

PROCESS OF SEPARATION OF HIGHER MOLECULAR WEIGHT DICARBOXYLIC ACIDS

Takeru Higuchi, Madison, Wis., assignor to The C. P. Hall Company of Illinois, Chicago, Ill., a corporation of Ohio Application September 6, 1951, Serial No. 245,405

8 Claims. (Cl. 210—42.5)

This invention relates to the separation of higher molecular weight straight-chain dicarboxylic acids from one another. By higher molecular weight dicarboxylic acids, we refer to dicarboxylic acids containing six or more carbon atoms. This invention relates more particularly to the separation of acids, having chains of six to ten carbon atoms.

DEFINITIONS

The "aqueous phase" of the system refers to the aqueous solution adsorbed on the adsorbent.

The "organic phase" is the non-aqueous or external phase of the system. If the dicarboxylic acids are added to the system in solution (and this is not necessary in a continuous process) the solvent employed will become part of the organic phase.

"Partition coefficient" is $$\frac{\text{concentration in water}}{\text{concentration in organic phase}}$$

when the two phases are in equilibrium.

"Development" refers to the process of increasing separation achieved by differential elution of the component acids.

THE PROCESS

The process of this invention employs a bed of insoluble hydrophilic adsorbent carrier which holds the aqueous phase of the system. The bed is usually stationary. If a moving bed is employed, as in a continuous process in which the organic phase and the adsorbent bed are moved countercurrent to one another, any suitable means for moving the bed may be employed which preserves to a substantial extent the relative positions of the respective particles of the bed and their adhering aqueous phase. Suitable hydrophilic adsorbents include an adsorbent form of silicic acid, alpha cellulose, kieselguhr, etc.

The dicarboxylic acids of the chain length here considered are relatively insoluble in water. By using a buffer with a pH above 4.5, the solubility is increased and this makes it possible to use organic phase which is more polar than could be employed without the buffer. The more polar solvents are desired because they are better solvents for the dicarboxylic acid. For dicarboxylic acids with a chain length of six to ten carbon atoms a pH of 5.1 to 6 is preferred. The buffer may be 1 molar or 2 molar, etc. as desired. High molar buffers tend to salt out the acids but possess higher buffer capacity. The buffer maintains the pH of the aqueous phase substantially constant throughout the process. Without sufficiently high buffer concentration, the acidity of the aqueous phase increases as the dicarboxylic acid dissolves into it, thus decreasing the effective partition coefficients of the respective acids and decreasing the efficiency of the separation. Buffers which may be employed include citrate, tartrate, phosphate, pyrophosphate, and other chemicals which give the desired hydrogen ion concentration and are soluble in the aqueous phase and substantially insoluble in the organic phase so that they will not readily leach out of the aqueous phase into the organic phase. The hydrogen ion concentration determines the rate at which the respective dicarboxylic acids are eluted in their travel through the adsorbent bed. The greater the alkalinity, the slower is the rate of elution, and vice versa. Buffer concentrations up to 3 molar may be used.

The dicarboxylic acids are introduced into the adsorbent bed in solution in a solvent which is substantially immiscible with the aqueous phase and is of relatively low polarity. In a continuous process, organic phase may be withdrawn from the system and used as the solvent for the mixed dicarboxylic acids. From an analytical standpoint a solvent mixture containing essentially chloroform is preferred for supplying the dicarboxylic acids to the bed of hydrophilic material. Preferably more or less of a more polar solvent, such as tertiary amyl alcohol or butanol, etc. is added to the chloroform to increase its polarity, and thus the solubility of the acids in the chloroform. Other solvents may be preferred commercially, such as dichlorobenzene, 1,2,3-trichloropropane, benzene (with addition of sufficient alcohol to increase its polarity), ethylene dichloride, etc. Instead of the alcohols one might employ other highly polar solvents to increase the solvency of the non-polar solvent, such as methylethyl ketone, diethyl ketone, methylpropyl ketone, etc.

The eluant employed must be substantially immiscible with the water phase. Using a stationary adsorbent bed, the removal of acids from the fixed aqueous phase may be facilitated by increasing the polarity of the eluant as the process proceeds, each increment being more polar than the preceding increment. Thus, as the removal of higher molecular weight acids occurs, a solvent containing increasing amounts of more polar constituents such as the alcohols, etc. will ordinarily be employed.

The higher molecular weight straight-chain dicarboxylic acids which may be separated by this process include:

$C_6$, adipic acid
$C_7$, pimelic acid
$C_8$, suberic acid
$C_9$, azelaic acid
$C_{10}$, sebacic acid Due to the smaller partition coefficient of dicarboxylic acids of greater molecular weight, such as those containing 12 carbon atoms and more, buffer solutions of higher pH are preferred where the separation of such longer-chain acids is involved. Theoretically an increase of 1.0 in the pH is desirable for each increase of 4 carbon atoms in the chain length of the dicarboxylic acid. Thus, in the separation of straight chain acids having 6 to 10 carbon atoms in the chain a pH of 5.4 is satisfactory. The separation of acids of 6 to 10 carbon atoms from acids of greater chain length can also be accomplished with a buffer of this pH. However, for the separation of close homologues of higher than $C_{10}$ chain length, a higher pH will be desirable.

In utilizing the process for the quantitative or qualitative analysis of a mixture of dicarboxylic acids, a temperature range near room temperature will ordinarily be employed. For separation on a commercial scale, the use of an elevated temperature is desirable in order to increase the solubility of the dicarboxylic acids in the organic phase, and their concentration therein, thereby increasing the amount of acids that can be recovered in equipment of a given size. Subsequently the dicarboxylic acids will be separated from the solvent by a suitable method as by cooling the solvent, or by distilling the solvent from the acids, or by converting the acid to a derivative, for example, by forming an insoluble salt, as by the addition of metallic hydroxide. Another method of separating the acids would be by treating the solution in a water-immiscible solvent with a water solution of ammonia to produce the ammonium salt. On separation of the acid from the solvent, the solvent may be used again as eluant with such adjustment of the polarity, etc. as may be required.

The invention will be further described by reference to the accompanying drawings, in which—

Figure 2:
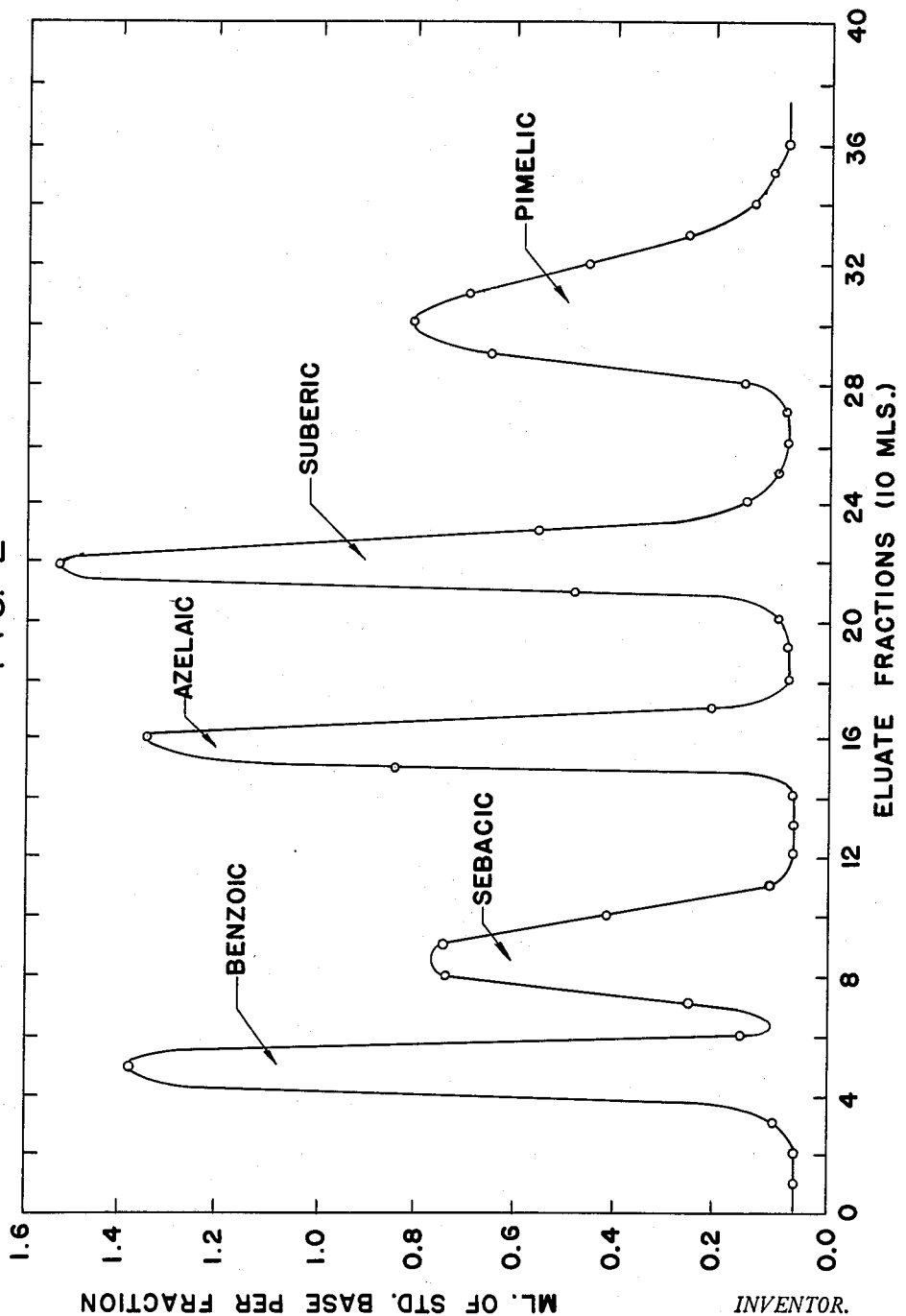
Figure 3:
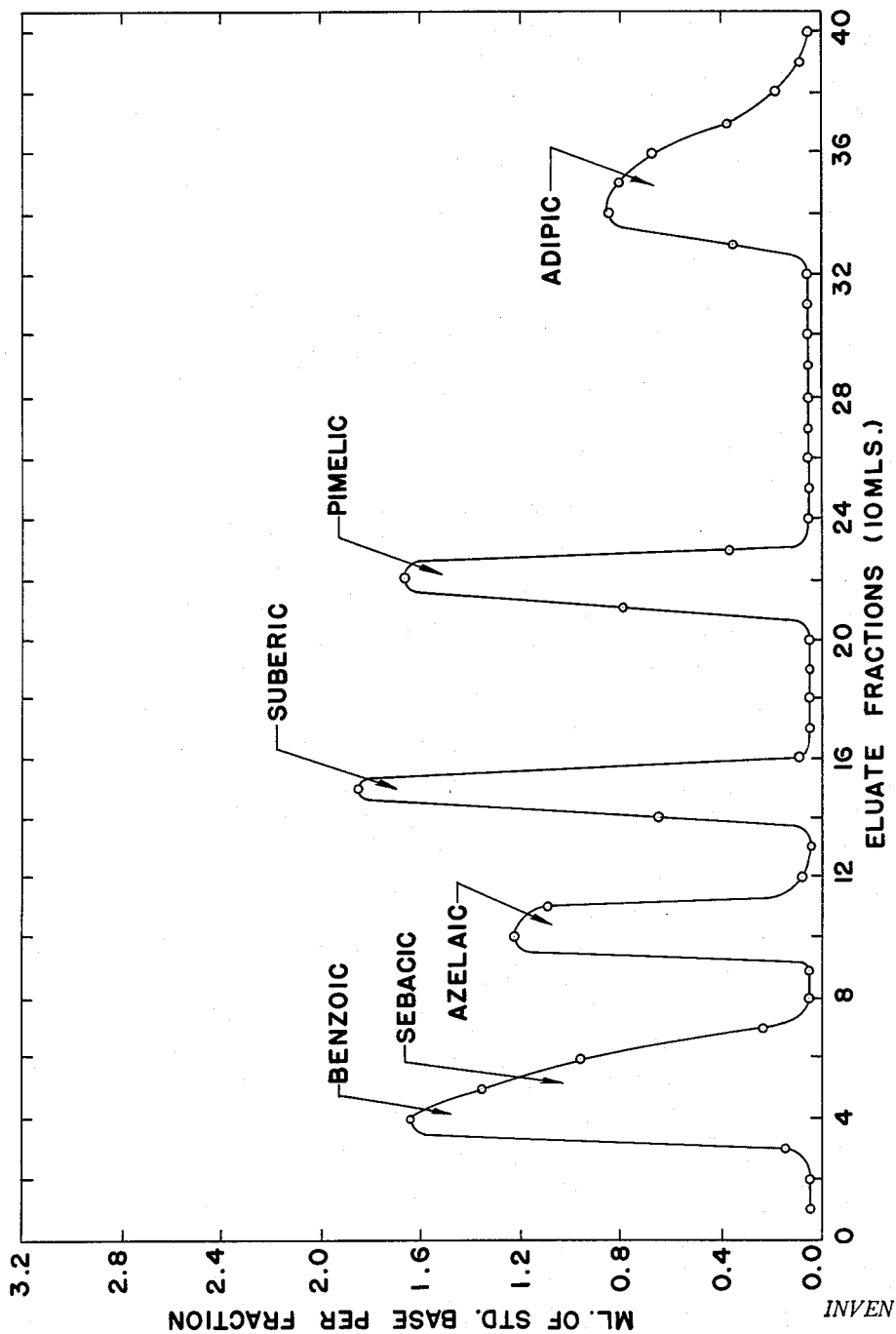

Fig. 1 is a schematic showing of apparatus which may be employed in the process; and Figs. 2–4 are graphs which illustrate how effectively the process may be used.

For analysis the apparatus will be regular laboratory equipment. For commercial operations, a column a foot in diameter up to several feet will be used, and the column will be up to five or ten or more feet in height.

For laboratory analysis a 20 mm. Pyrex column 45 cm. long may be used. The bed may be prepared as follows: 25 grams of silicic acid (chromatographic grade) and 25 ml. of the aqueous phase are thoroughly worked together in a 400 ml. beaker with a spatula. Roughly 200 ml. of 3% n-butanol, 97% chloroform mixture are added and a homogeneous suspension formed by vigorous stirring. This suspension is packed incrementwise into the column, care being taken to prevent formation of air pockets or other forms of heterogeneity. Each increment is packed down uniformly, quite firmly with a close-fitting glass plunger. Finally a circle of filter paper is placed on the top of the packing.

The following examples illustrate the invention. In these examples the adsorbent bed was prepared as described above, and remained stationary, the feed solution of the dicarboxylic acids, and then the eluant were poured in onto the top of the filter paper covering the bed. In preparing the bed the aqueous phase was prepared with citrate buffer. Where one-molar buffer is mentioned in the examples the aqueous phase was prepared by adding sufficient one molar citric acid solution to one molar sodium citrate solution to give the desired hydrogen ion concentration. To prepare a two-molar buffer, two-molar citric acid was added to two-molar sodium citrate solution to produce the desired hydrogen ion concentration. In carrying out each of the examples a developing eluant was used, as explained in detail in connection with the first example.

The organic solvent mixed with the adsorbent in forming the bed is first allowed to drain until there is no excess solvent standing on the top of the bed. The solution of the mixture of dicarboxylic acids was then added to the top of the column and allowed to drain until only a few drops of excess solvent remained at the head of the adsorbent section. A developing eluant was employed in which each succeeding increment contained an increasing amount of n-butanol, as explained in connection with the first example. One milliliter of the initial developing eluant was used to wash down the side of the column and this was again allowed to drain until nearly gone. This last washing process was repeated twice more before filling the column with the remainder of the developing eluant.

A total of 400 milliliters of developing eluant was employed with each example. The eluate was collected as forty 10-milliliter samples each of which was titrated to determine the amount of the dicarboxylic acid present. The amount present in each sample was plotted to give the curves shown in Figs. 2 through 4. In order to illustrate the separation of monocarboxylic acids from the dicarboxylic acids, a certain amount of benzoic acid was added to each sample of mixed dicarboxylic acids. The nature of the monocarboxylic acid present as impurity will vary with the process employed in producing the dicarboxylic acids. The process here disclosed may be used for separating from the dicarboxylic acids such less polar monocarboxylic acids as pelargonic acid, caproic acid, capric acid, caprylic acid, and other higher molecular weight straight chain aliphatic monocarboxylic acids.

*Example 1*

A one-per cent solution of a mixture of 10.0 mg. each of sabacic, azelaic, suberic and pimelic acids was prepared in a mixed solvent of 5 per cent t-amyl alcohol and 95 per cent chloroform. (All percentage mixtures of solvents mentioned herein refer to percentage by volume.) The solution is advantageously prepared by dissolving the acids in the warm amyl alcohol and then adding the chloroform.

A 5 ml. sample of the solution is pipetted into the apparatus prepared with one molar citrate buffer with a pH of 5.40.

After the solution of the mixed acids had been allowed to drain through the bed, it was developed with eluant to recover the respective acids. Four hundred milliliters of eluant were used, succeeding increments being more and more polar, as follows:

| Milliliters | Volume of Chloroform | Volume of n-Butanol |
| --- | --- | --- |
| 0–40 | 97 | 3 |
| 40–100 | 95 | 5 |
| 100–160 | 90 | 10 |
| 160–220 | 80 | 20 |
| 220–400 | 65 | 35 |

Ten milliliter fractions of eluate were collected. These were analyzed by the following procedure: Five milliliters of absolute alcohol are added to each fraction. The fractions were then titrated with 0.04 to 0.05 N alcoholic sodium hydroxide. Meta cresol purple was used as an indicator. The alcohol was added to sharpen the endpoint and to permit single-phase titration of the chloroform solutions. The respective fractions were analyzed for their acid content, and the curve shown in Fig. 2 was obtained by plotting the acid present in each of the forty 10 ml. samples of eluate in the order in which they were obtained. The sample contained adipic acid which was not eluted, but remained in the bed. The higher molecular weight monobasic acids are less polar than the dicarboxylic acids and would be eluted before the dicarboxylic acids as benzoic acid was in the example.

For separation of the acids in their pure form on a commercial scale it is not necessary to collect the eluate in increments of the same size—assuming of course that the mixture of acids treated remains substantially constant in composition. After it has been determined where the peaks are, and in general where the fractions are to be collected in order to recover all or substantially all of the respective acids in individual fractions, it can be determined what fractions will be collected, assuming there is only small variance in the analysis of the starting mixture. However, a continuous check of the acidity of the eluate will ordinarily be preferable, the acid portions of eluate being separately collected and containing the respective dicarboxylic acids. Electronic means may be employed for determining the onset of the respective elution peaks and the collection of the fractions be controlled accordingly, to collect the respective acids with minimum solute-free eluate. This will permit the separate recovery of solute-free eluate for reuse with adjustment of polarity as required.

Thus, referring to Fig. 2, the first 60 ml. will be separately collected to remove the monobasic acid impurity. The next five or six fractions or possibly the next 5.5 (which will be larger than indicated on the graph if the operation is carried out on a commercial scale) will be separately recovered and treated for the separation of sebacic acid. Fractions 14 to 18 will be collected together and treated for recovery of azelaic acid. Fractions 20 to 26 contain the suberic acid and will be treated to separate it. The pimelic acid will be recovered in fractions 28 through 36, and perhaps the last half of fraction 27 will also be included. The intermediate fractions of eluate, which contain no acid or only an inappreciable amount, will be reused as solvent or eluant with adjustment of the polarity as required. Thus the various acids are separated and recovered, in any suitable manner as by removal of the solvent by distillation.

*Example II*

In this example, a one molar citrate buffer of pH 5.20 was used. The same mixture of dicarboxylic acids was added in an amyl alcohol-chloroform solution, as before. The respective acids were recovered in different fractions of the eluate as shown by the curve in Fig. 3.

The results illustrate the effect of hydrogen ion concentration on the elution rate and position of the peaks in the curve. The shift to the left shows an increase in the elution rate. A lower pH would cause any given acid component to elute earlier and possible elution of a lower molecular weight acid before all of the higher molecular weight acid has been eluted from the system. The curve illustrates the impossibility of entirely separating a monobasic acid such as benzoic acid from the $C_{10}$ dicarboxylic acid. However, using this pH the respective dicarboxylic acids including adipic acid can be separated from one another.

*Example III*

In this example, two molar citrate buffer of pH 5.40 was used to prepare the column. Although the pH is the same as with the first example the curve (Fig. 4) shows a slight increase in the rate of elution, possibly due to the salting-out effect of the higher concentration of salt in the aqueous phase. As a result the separation between sebacic acid and the monobasic acid is not complete.

The process may be used for the separation of several of the acids from one another. It may likewise be used to separate an impurity from one or more of the acids. It may be used to separate only two acids. Likewise it may be used to separate one or more acids of higher molecular weight from one of more acids of lower molecular weight. In a continuous process the feed will be introduced at an intermediate point in the system, more polar of the feed materials will be removed with the adsorbent and the less polar with the eluate.

What I claim is:

1. The process of separating two adjacent homologues of the straight-chain alpha, omega-dicarboxylic acids containing six to ten carbon atoms in a two-phase system which includes an aqueous liquid phase and an organic liquid phase, utilizing the partition coefficients of the respective acids, said partition coefficients being different, which process comprises preparing a bed of hydrophilic adsorbent wet with aqueous buffer which is soluble in the aqueous phase and substantially insoluble in the organic phase and has a strength no greater than three molar and a pH of 5.1 to 6.0, and providing organic phase in the bed, introducing into the bed a solution of a mixture of the acids in solvent which eventually forms part of the organic phase eluate, and while the aqueous phase adheres to the bed, washing the bed with organic eluant immiscible with the aqueous phase and which eventually forms organic phase eluate, thereby dissolving into the aqueous phase the shorter chain dicarboxylic acid and retaining it there while removing the longer chain dicarboxylic acid from the system dissolved in the organic phase eluate, and maintaining the organic phase in moving contact with the aqueous phase during the washing for a sufficient period to effect substantially complete separation of the two acids.

2. The process of separating adipic acid, pimelic acid, suberic acid, azelaic acid and sebacic acid from an admixture thereof utilizing a two-phase separation system which includes an aqueous liquid phase and an organic liquid phase immiscible with one another, utilizing the partition coefficients of the respective acids, which process comprises preparing a bed of hydrophilic adsorbent wet with aqueous buffer which is soluble in the aqueous phase and substantially insoluble in the organic phase and has a strength no greater than three molar and a pH of 5.1 to 6.0 and providing liquid organic phase in the bed, introducing into the bed a solution of a mixture of the acids in solvent which eventually forms part of the organic phase eluate, and while the aqueous phase adheres to the bed washing the bed with organic eluant immiscible with the aqueous phase which eluant eventually forms organic phase eluate, thereby dissolving the adipic, pimelic, suberic and azelaic acids into the aqueous phase while removing the sebacic acid from the system in the organic phase eluate, and then successively dissolving the azelaic acid, the suberic acid, the pimelic acid and the adipic acid into the organic phase while maintaining the organic phase in moving contact with the aqueous phase and removing the acids from the system as eluate, and separately collecting the portions of eluate containing the respective acids.

3. The process of separating suberic acid, azelaic acid and sebacic acid from an admixture thereof utilizing a two-phase separation system which includes an aqueous liquid phase and an organic liquid phase immiscible with one another, utilizing the partition coefficients of the respective acids, which process comprises preparing a bed of hydrophilic adsorbent wet with aqueous buffer which is soluble in the aqueous phase and substantially insoluble in the organic phase and has a strength no greater than three molar and a pH of 5.1 to 6.0, and providing liquid organic phase in the bed, introducing into the bed a solution of a mixture of said acids in solvent which eventually forms part of the organic phase eluant, and while the aqueous phase adheres to the bed washing the bed with organic eluant immiscible with the aqueous phase which eluant eventually forms organic phase eluate, thereby dissolving the suberic and azelaic acids into the aqueous phase while removing the sebacic acid from the system in the organic phase eluate, and then successively dissolving the azelaic acid and the suberic acid into the organic phase while maintaining the organic phase in moving contact with the aqueous phase and removing these acids from the system as eluate, and separately collecting the portions of eluate containing the respective acids.

4. The process of separating pimelic acid, suberic acid and azelaic acid from an admixture thereof utilizing a two-phase separation system which includes an aqueous liquid phase and an organic liquid phase immiscible with one another, utilizing the partition coefficients of the respective acids, which process comprises preparing a bed of hydrophilic adsorbent wet with aqueous buffer which is soluble in the aqueous phase and substantially insoluble in the organic phase and has a strength no greater than three molar and a pH of 5.1 to 6.0, and providing liquid organic phase in the bed, introducing into the bed a solution of a mixture of said acids in solvent which eventually forms part of the organic phase eluant, and while the aqueous phase adheres to the bed washing the bed with organic eluant immiscible with the aqueous phase which eluant eventually forms organic phase eluate, thereby dissolving the pimelic and suberic acids into the aqueous phase while removing the azelaic acid from the system in the organic phase eluate, and successively dissolving the suberic acid and the pimelic acid into the organic phase while maintaining the organic phase in moving contact with the aqueous phase and removing these acids from the system as eluate, and separately collecting the portions of eluate containing the respective acids.

5. The process of separating suberic acid and azelaic acid from an admixture thereof utilizing a two-phase separation system which includes an aqueous liquid phase and an organic liquid phase immiscible with one another, utilizing the partition coefficients of the respective acids, which process comprises preparing a bed of hydrophilic adsorbent wet with aqueous buffer which is soluble in the aqueous phase and substantially insoluble in the organic phase and has a strength no greater than three molar and a pH of 5.1 to 6.0, and providing liquid organic phase in the bed, introducing into the bed a solution of a mixture of said acids in solvent which eventually forms part of the organic phase eluant, and while the aqueous phase adheres to the bed washing the bed with organic eluant immiscible with the aqueous phase which eluant eventually forms organic phase eluate, thereby dissolving the suberic acid into the aqueous phase while removing the azelaic acid from the system in the organic phase eluate.

6. The process of separating azelaic acid and sebacic acid from an admixture thereof utilizing a two-phase separation system which includes an aqueous liquid phase and an organic liquid phase immiscible with one another, utilizing the partition coefficients of the respective acids, which process comprises preparing a bed of hydrophilic adsorbent wet with aqueous buffer which is soluble in the aqueous phase and substantially insoluble in the organic phase and has a strength no greater than three molar and a pH of 5.1 to 6.0, and providing liquid organic phase in the bed, introducing into the bed a solution of a mixture of said acids in solvent which eventually forms part of the organic phase eluant, and while the aqueous phase adheres to the bed washing the bed with organic eluant immiscible with the aqueous phase which eluant eventually forms organic phase eluate, thereby dissolving the azelaic acid into the aqueous phase while removing the sebacic acid from the system in the organic phase eluate.

7. The improvement in the process of chromatographically separating two adjacent homologues of the straight-chain alpha, omega-dicarboxylic acids containing six to ten carbon atoms, employing an absorbent bed and a two-phase liquid system, using water as the internal phase and an immiscible solvent as the external phase, which improvement comprises using an acid buffer with a pH above 4.5 in the aqueous internal phase and using water-immiscible organic eluant to dissolve the acids successively.

8. The improvement in the process of chromatographically separating two adjacent homologues of the straight-chain alpha, omega-dicarboxylic acids containing six to ten carbon atoms, employing an absorbent bed and a two-phase liquid system, using water as the internal phase and chloroform as the external phase, which improvement comprises using an acid buffer with a pH above 4.5 in the aqueous internal phase and using an admixture of alcohol with chloroform to dissolve the acids successively.

References Cited in the file of this patent

UNITED STATES PATENTS

| | | |
|---|---|---|
| 2,170,601 | Wilson et al. | Aug. 22, 1939 |
| 2,296,850 | Harrison | Sept. 29, 1942 |
| 2,352,932 | Barrett et al. | July 4, 1944 |
| 2,470,339 | Claussen et al. | May 17, 1949 |

FOREIGN PATENTS

| | | |
|---|---|---|
| 558,320 | Great Britain | Dec. 31, 1943 |
| 585,224 | Great Britain | Feb. 3, 1947 |

OTHER REFERENCES

Blackburn: Biochemical Journal, vol. 45, 1949, pages 579–84.

Marvel et al.: J. Am. Chem. Soc., vol. 72, pages 2642–6, 1950.

Dobson et al.: ibid., page i of Proceedings.